Patented July 18, 1944

2,353,936

UNITED STATES PATENT OFFICE 2,353,936

AIR FILTERING MATERIAL

Irving Newton Smith, Granville, Ohio, assignor to Owens-Corning Fiberglas Corporation, a corporation of Delaware No Drawing. Application November 18, 1941, Serial No. 419,620

5 Claims. (Cl. 183—45)

This invention relates to filters and filtering materials for use in filtering dust and the like from air or other gases. More particularly it relates to materials or substances to which dust will adhere, such material being applied to a fibrous base such as fibrous or shredded metal, paper or other filtering media.

The dust catching and retaining material or so-called adhesive previously used in air filters was usually petroleum oil. Although this material is effective as a dust catcher it is inflammable, thereby creating a fire hazard. In the case of a filter having a base of fibrous or shredded material, the fire hazard is increased due to the finely divided nature of the oil on the base. As one feature of the present invention, the filter base is formed of glass wool which, because of its incombustibility, greatly reduces the fire hazard. However, when employed with an inflammable adhesive the glass wool cannot eliminate all danger of fire.

It has been attempted to overcome these objections by using very heavy oils which are less inflammable although these, too, are combustible when exposed to flame. The heavy oils, however, because of their high viscosity, wet dust particles slowly and as a result the dust collecting efficiency of the filter was seriously lowered. It has also been suggested to add a fire-proofing material to low viscosity oil to secure non-inflammability. Many of the truly flame-proof compounds which could be added to such oils are solids so that the resulting flame-proof oil was of too great a viscosity.

An object of the present invention is to provide a filter adhesive free from the objections to previous materials. The material of the present invention is non-inflammable, odorless and inexpensive and has a large capacity for holding dust.

It is a further object of the present invention to provide a completely non-combustible dust catching filter material as distinguished from the merely non-inflammable materials heretofore employed. I obtain this object by providing a dust catching material in an aqueous system, the material consisting mainly of an inorganic substance. The combination of this material with an inorganic filter base such as glass wool provides a truly fireproof filter. It also provides a readily washable filter since the aqueous system and adhering dust may be easily rinsed from the base with water and without deleterious effect on the wool. The base may be then retreated by the application of fresh adhesive.

I have discovered that a dust catching material having the desirable properties of non-combustibility, good dust catching efficiency, freedom from odor and low cost, may be obtained by employing a deliquescent inorganic substance that forms an aqueous solution of relatively low vapor pressure, thereby providing a permanent liquid that will effectively catch and retain dust particles. It is possible, according to the present invention, to employ an aqueous system that will not dry in use by providing a material that forms a water solution whose initial vapor pressure is below that of water in the atmosphere, at the temperatures at which the filter is to operate. With this set of conditions the dust catching solution retains its liquidity and may even take up moisture from the air passing through the filter.

The metallic chloride salts that form a low vapor pressure water solution have been found particularly satisfactory for the present invention. Preferably I employ zinc chloride but other deliquescent salts such as lithium chloride may be employed. However, zinc chloride is much less expensive and is therefore preferred. Other non-metallic, inorganic, deliquescent substances that are adapted to the present invention are phosphoric acid and sulfuric acid but because of the corrosive nature of the latter substance it is useful only under certain conditions as where the filter can be employed removed from any metal parts.

Zinc chloride is particularly suited to the purpose of the present invention because it forms a water solution having a very low vapor pressure. The vapor pressure of such solution is approximately as low as the vapor pressure of atmospheric moisture at 5% relative humidity within the range of temperatures normally encountered by the filters in use. A humidity as low as 5% is very seldom, if ever, met with in the conditions under which air filters are employed so that the filter adhesive retains its liquidity under substantially all humidity conditions to which it may be subjected.

I have discovered that an aqueous solution of zinc chloride has considerable surface tension so that it wets most dust particles with difficulty and, therefore, is not fully effective as a filter adhesive for some types of dust. This is overcome in the present invention by adding a wetting agent to the zinc chloride solution. This wetting agent may be either a neutral wetting agent or a cationic-active wetting agent. The anionic wetting agents have not been found suitable since they are precipitated by the zinc chloride.

An acid stable neutral wetting agent that has been found very satisfactory is a modified mannitol monolaurate which is obtainable under the trade name of Atlas G-9046T. This may be replaced if desired by sorbitol monolaurate or by cationic-active wetting agents of the type used in the dyeing of textiles or by other suitable wetting agents. It is also desirable to employ wetting agents with sulfuric acid and phosphoric acid to improve the efficiency of these materials as filter adhesives.

In the practice of the present invention it is preferable to use a saturated aqueous solution of zinc chloride although more dilute solutions may be used if found desirable. The saturated solution enables an ample amount of zinc chloride to be applied to the filter by coating the filter base with only a relatively small amount of the solution. To this concentrated solution a wetting agent is added in proportions of substantially three parts of wetting agent to 1000 parts by weight of the solution in the case of modified mannitol monolaurate. This material is then sprayed or otherwise applied to the filter base.

In place of zinc chloride, I have found it possible to use calcium chloride where the atmospheric conditions are such that the relative humidity does not drop below about 30% at normal operating temperatures. A concentrated calcium chloride solution may, for instance, be employed in filters for removing dust from the air in textile plants and similar places where a very high relative humidity is normal. Calcium chloride has the advantage for such application of being less expensive but the solution has a high surface tension so that it is not satisfactory for some types of dust.

Various modifications of my invention may be made within the scope of the claims.

I claim:

1. A dust filter including a base of glass wool and a dust catching adhesive on the fibers of said base consisting of a stable aqueous solution of zinc chloride admixed with a wetting agent selected from the group consisting of mannitol monolaurate and sorbitol monolaurate.

2. A dust filter including a base of glass wool and a dust catching adhesive on the fibers of said base consisting of a stable aqueous solution of zinc chloride admixed with mannitol monolaurate in proportions of about .3% by weight of the zinc chloride.

3. A dust filter including a base of glass wool and a dust catching adhesive on the fibers of said base consisting of a stable aqueous solution of zinc chloride admixed with a wetting agent, the moisture content of said adhesive being in equilibrium with the moisture content of the atmosphere surrounding said filter.

4. Filter material for filtering dust particles out of gas comprising a porous base of fibrous glass, and a coating thereon of a deliquescent substance in water solution admixed with a wetting agent, said substance forming a stable solution of low vapor pressure and being selected from the group consisting of zinc chloride and lithium chloride.

5. Filter material for filtering dust particles out of gas comprising a porous base of fibrous glass, and a dust adhesive coating thereon consisting of a stable solution of zinc chloride in water admixed with a wetting agent.

IRVING NEWTON SMITH.